United States Patent [19]

Warhol

[11] Patent Number: 4,489,974
[45] Date of Patent: Dec. 25, 1984

[54] VISOR ASSEMBLY INCLUDING FRICTION MOUNT

[76] Inventor: John G. Warhol, 14041 Vernon Ave., Oak Park, Mich. 48237

[21] Appl. No.: 423,677

[22] Filed: Sep. 27, 1982

[51] Int. Cl.³ .............................................. B60J 3/00
[52] U.S. Cl. ............................... 296/97 K; 296/97 R; 248/291; 403/146; 403/372
[58] Field of Search ................... 296/97 R, 97 H, 97 J, 296/97 K, 97 G; 248/293, 291, 294, 240.4; 160/DIG. 3; 403/84, 145.6, 372

[56] References Cited

U.S. PATENT DOCUMENTS

| | | | |
|---|---|---|---|
| 2,462,304 | 2/1949 | Burdick | 296/97 K |
| 2,625,426 | 1/1953 | Weymouth | 248/291 |
| 2,908,517 | 10/1959 | Peras | 296/97 R |
| 3,035,864 | 5/1962 | Davidson | 248/293 |
| 3,910,627 | 10/1975 | Meyer | 296/97 K |
| 3,926,470 | 12/1975 | Marcus | 296/97 B |

FOREIGN PATENT DOCUMENTS 2530111  1/1977  Fed. Rep. of Germany ... 296/97 H

*Primary Examiner*—Randolph Reese
*Assistant Examiner*—Russell D. Stormer
*Attorney, Agent, or Firm*—Emrich & Dithmar

[57] ABSTRACT

A sun visor assembly has a rotatable friction mount including an elongated shaft receiving thereon an inner tubular friction member, two tubular spacers and a helical compression spring, all telescopically received within an outer tubular member and trapped between longitudinally-spaced apart retainer washers. Notches adjacent to the ends of the tubular friction member define hinged end portions which are tiltable under the urging of the compression spring radially outwardly into frictional engagement with the outer tubular member. A similar hinged tiltable end portion may be formed on one of the spacer members. Plural pairs of notches may be formed in the inner frictional member to define plural sets of hinged tiltable portions. In one embodiment the outer surface of the inner frictional member has longitudinal ribs disposed for ratcheting engagement with spring clips which project inwardly through apertures in the outer tubular member. A visor panel is secured to the outer tubular member and may be provided with a vacuum-formed recess for receiving an associated mirror, covered by a hingedly mounted cover on the visor panel.

34 Claims, 12 Drawing Figures

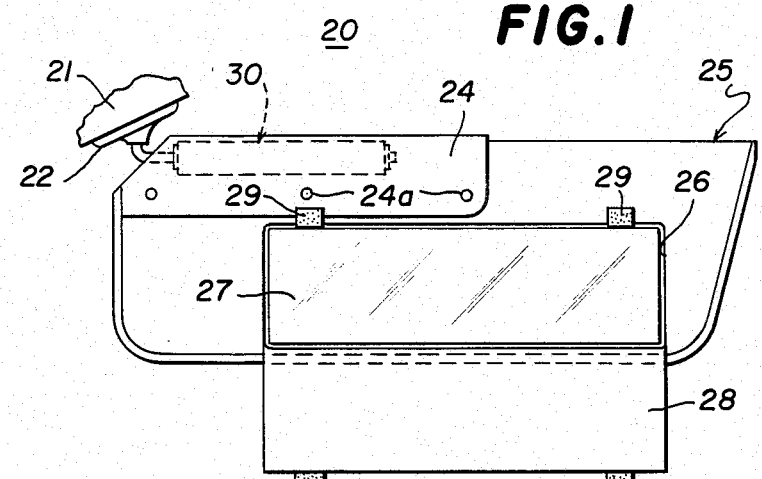
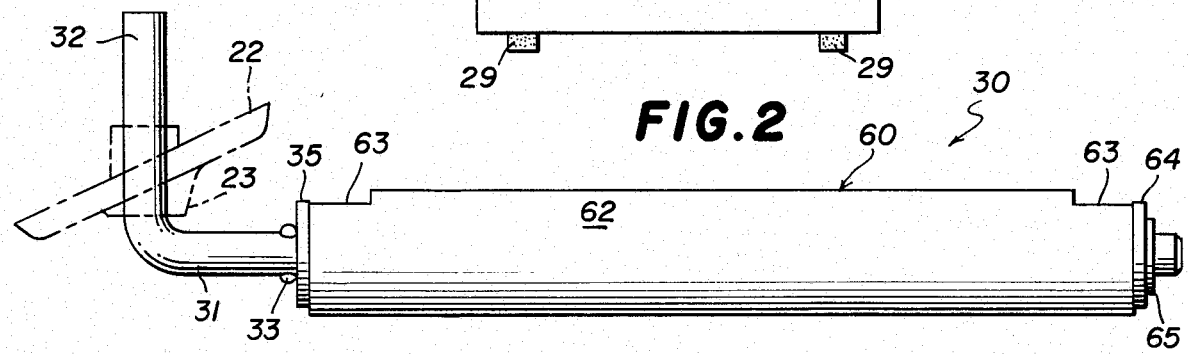
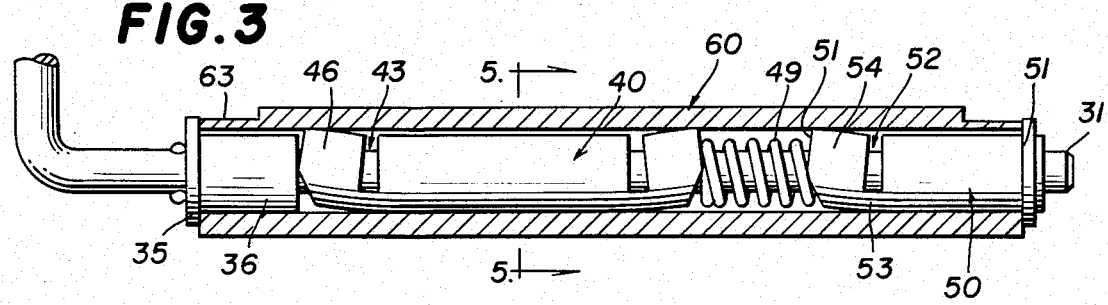
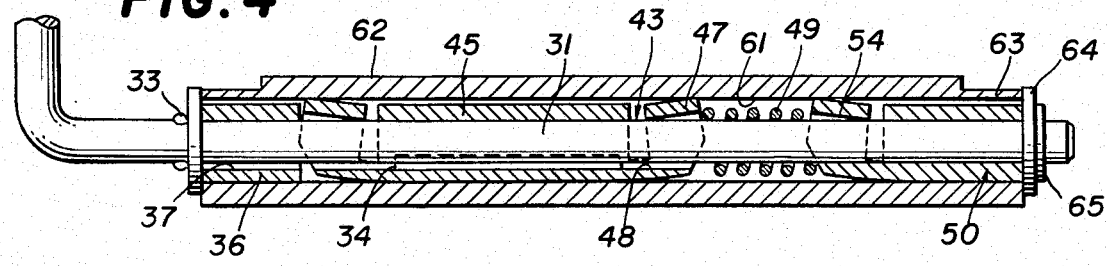
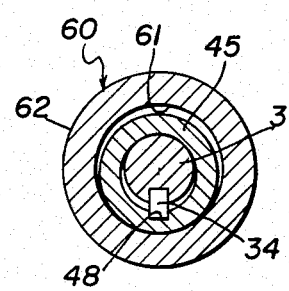
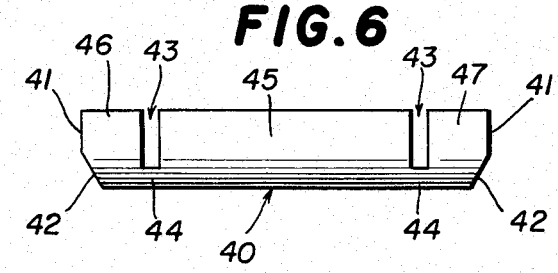

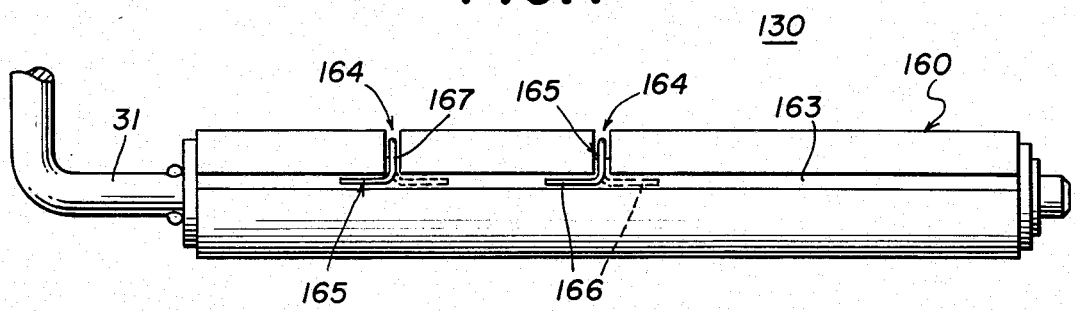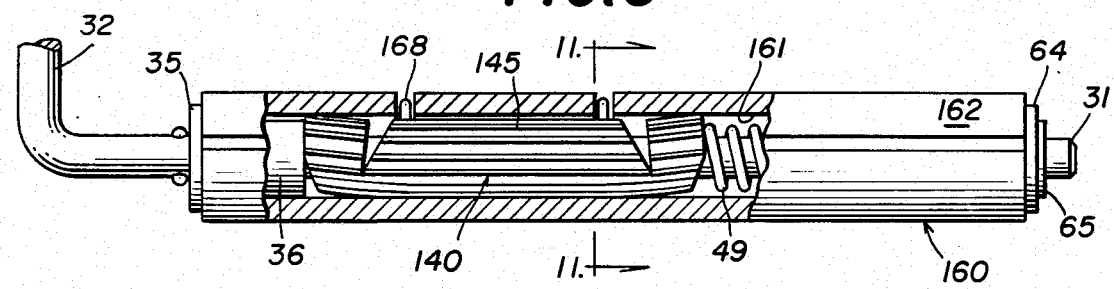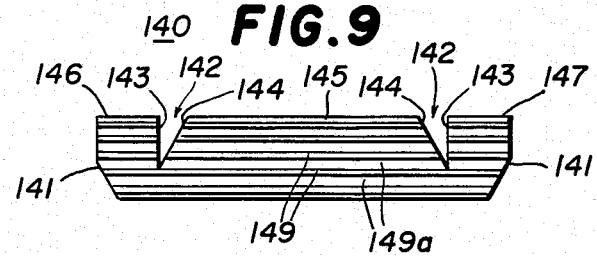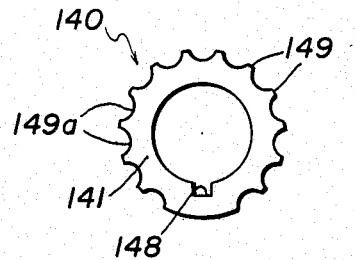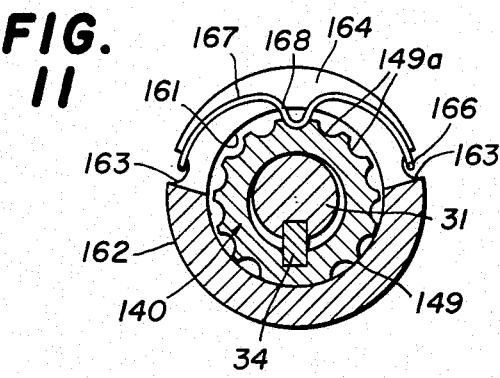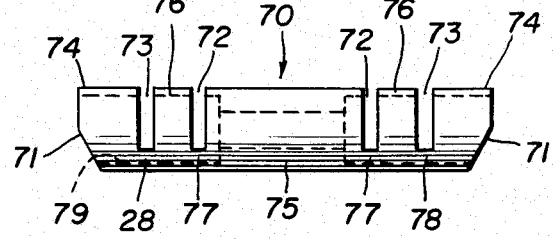

VISOR ASSEMBLY INCLUDING FRICTION MOUNT

BACKGROUND OF THE INVENTION

The present invention relates to rotatable friction mounts of the type used for mounting an automobile sun visor or the like, and further relates to sun visor assemblies incorporating such friction mounts.

Prior friction mounts for sun visor assemblies or the like having included an elongated metal rod on which the visor is rotatably mounted, the friction being provided by a spring or clamping mechanism which frictionally engages the metal rod. Such arrangements are characterized by rapid wear of the parts, which have a relatively small diameter and, therefore, a small frictional bearing surface. Furthermore, such prior friction mounts have been non-self-adjusting. Thus, as the mechanism becomes worn, the visor becomes loose and will tend to drop to a vertical orientation rather than remain in a position to which it is rotated. Friction mounts which have afforded adequate wear-resistance have been of relatively complex and expensive construction.

SUMMARY OF THE INVENTION

It is a general object of this invention to provide an improved friction mount for a visor or the like which avoids the disadvantages of prior friction mounts while affording additional structural and operating advantages.

An important object of this invention is the provision of a friction mount which is of relatively economical construction while affording adequate frictional characteristics.

A further object of this invention is the provision of a friction mount of the type set forth which is self-adjusting and relatively wear-resistant.

Still another object of this invention is the provision of a friction mount of the type set forth which permits a stepped-type rotational movement.

Another object of this invention is the provision of a visor assembly utilizing the friction mount of the present invention.

In connection with the foregoing object, it is another object of this invention to provide a visor assembly of the type set forth which includes a molded visor having a covered mirror received in a recess therein.

These and other objects of the invention are attained by providing a rotatable friction mount for a visor or the like comprising a fixed inner elongated member having a flexible portion, an outer tubular member telescopically surrounding the inner member and rotatable with respect thereto about the longitudinal axis of the outer member, and bias means coupled to the inner member and resiliently urging the flexible portion radially of the outer member into frictional engagement therewith thereby frictionally to inhibit rotational movement thereof.

The invention consists of these and other novel features and a combination of parts hereinafter fully described, illustrated in the accompanying drawings and particularly pointed out in the appended claims, it being understood that various changes in the details may be made without departing from the spirit or sacrificing any of the advantages of the invention.

BRIEF DESCRIPTION OF THE DRAWINGS

FIG. 1 is a side elevational view of a visor assembly incorporating the friction mount assembly constructed in accordance with and embodying the features of the present invention;

FIG. 2 is an enlarged side elevational view of the friction mount assembly of FIG. 1;

FIG. 3 is a view similar to FIG. 2, with the outer tubular member in vertical section to illustrate the internal construction of the device;

FIG. 4 is a view of the friction mount assembly of FIG. 2 in vertical, longitudinal section;

FIG. 5 is a further enlarged view in vertical section taken along the line 5—5 in FIG. 3;

FIG. 6 is a side elevational view of the inner frictional member of the friction mount assembly of FIG. 3;

FIG. 7 is a side elevational view of an alternative embodiment of the friction mount assembly of FIG. 2;

FIG. 8 is a view similar to FIG. 7, with portions of the outer tubular member broken away to illustrate the internal construction of the assembly;

FIG. 9 is a side elevational view of the inner frictional member of the assembly of FIG. 8;

FIG. 10 is an end elevational view of the inner frictional member of FIG. 9;

FIG. 11 is an enlarged view in vertical section taken along the line 11—11 in FIG. 8; and FIG. 12 is a side elevational view, similar to FIG. 6 of an alternative embodiment of the inner frictional member of the friction mount assembly of FIG. 2.

DESCRIPTION OF THE PREFERRED EMBODIMENTS

Referring to FIGS. 1 and 2 of the drawings, there is illustrated a sun visor assembly, generally designated by the numeral 20, of the type which may be mounted on the roof 21 of an automobile or other vehicle by means of an attachment plate 22 for shielding the driver's eyes from the sun. The attachment plate 22 has a bushing 23 for receiving therethrough the shaft of a friction assembly, generally designated by the numeral 30, constructed in accordance with and embodying the features of the present invention. A visor panel 25 is securely fastened to the friction mount assembly 30, as by an attachment flap 24 which is wrapped around the friction mount assembly 30 and fixedly secured in place, as by fasteners 24a. The visor panel 25 may be of unitary one-piece construction, manufactured as by vacuum forming and having a generally rectangular recess 26 formed in the rear surface thereof for receiving therein a mirror 27 which may be adhesively secured in place. A cover 28 is hingedly attached to the visor panel 25 along the bottom edge of the mirror 27 by any suitable means for hinged movement between an open position, illustrated in FIG.1, and a closed position covering the mirror 27, the cover 28 being held in its closed position by Velcro tabs 29 or other suitable fasteners. If desired, suitable illumination means (not shown) may be provided for the mirror 27.

Referring now also to FIGS. 3 through 6 of the drawings, the friction mount assembly 30 includes an elongated metal rod or shaft 31 having a mounting leg 32 projecting from one end thereof substantially normal thereto and received through the bushing 23 of the attachment plate 22. The shaft 31 may be provided with circumferentially spaced-apart stop beads 33 adjacent to the mounting leg 32. Integral with the shaft 31 intermediate the ends thereof and projecting radially therefrom is an elongated key 34. A retaining washer 35 is fitted over the distal end of the shaft 31 until it is stopped against the beads 33. A tubular spacer 36 is then fitted over the shaft 31 coaxially therewith and bears against the retaining washer 35, the spacer 36 having an elongated keyway groove 37 in the inner surface thereof for accommodating the key 34 and permitting passage of the spacer 36 thereover.

The friction mount assembly 30 also includes an inner tubular friction member, generally designated by the numeral 40, which may be formed of the same material as the spacer 36 and has substantially the same radial dimensions. The friction member 40 has parallel end surfaces 41 disposed substantially normal to the longitudinal axis thereof and extending approximately midway across the diameter of the friction member 40 and there intersecting inclined end surfaces 42. Formed in the friction member 40 respectively adjacent to the opposite ends thereof are two radially inwardly extending notches 43, each extending a little more than halfway across the diameter of the friction member 40, and each having parallel side walls which are disposed substantially normal to the longitudinal axis of the friction member 40. The uncut portions of the friction member 40 at the bottoms of the notches 43 define flexible hinge portions 44 which respectively divide a central portion 45 of the friction member 40 from end portions 46 and 47 thereof. Extending the length of the inner surface of the friction member 40 along the continuous portion thereof opposite the notches 43 is an elongated keyway groove 48.

In use, the friction member 40 is received over the end of the shaft 31 with the end surface 41 of the end portion 46 abutting the adjacent end of the spacer 36, the key 34 being accommodated in the keyway groove 48 effectively to prevent rotational movement of the friction member 40 with respect to the shaft 31 about the longitudinal axis thereof.

A helical compression spring 49 is then fitted over the end of the shaft 31 and bears against the end surface 41 of the end portion 47 of the friction member 40. There is also provided a tubular spacer 50 which may be formed of the same material as the spacer 36 and the friction member 40 and having the same radial dimensions, the spacer 50 having parallel end surfaces 51 disposed substantially normal to the longitudinal axis thereof. Formed in the tubular spacer 50 adjacent to the inner end thereof is a radially-extending notch 52 having parallel side walls disposed substantially normal to the longitudinal axis of the spacer 50 and extending slightly more than halfway across the diameter thereof. The uncut portion of the tubular spacer 50 below the notch 52 forms a flexible hinge 53 which divides an end portion 54 of the tubular spacer 50 from the remainder thereof. In use, the tubular spacer 50 is fitted over the end of the shaft 31 with the end portion 54 bearing against the compression spring 49.

The friction mount assembly 30 also includes an outer tubular member 60 which is dimensioned to slide telescopically over the inner friction member 40, the spacers 36 and 50 and the compression spring 49 and abut against the retaining washer 35. The tubular member 60 is circular in transverse cross section and has a cylindrical inner surface 61 and an outer surface 62, the inner surface 61 preferably having a diameter very slightly greater than the outer diameter of the friction member 40 and the spacers 36 and 50 so as to fit slidably thereover. The outer surface 62 has formed therein, respectively adjacent to the opposite ends thereof, two flat surfaces 63. The attachment flap 24 may be provided with projections which respectively engage the flat surfaces 63 on the outer tubular member 60, effectively to prevent rotational and longitudinal movement of the visor panel 25 with respect to the friction mount assembly 30. A retainer washer 64 is fitted over the outer end of the spacer 50.

The parts are dimensioned so that when the friction member 40, the compression spring 49 and the spacer 50 are in their relaxed condition, the outer end of the spacer 50 will project outwardly well beyond the adjacent end of the tubular member 60. In assembly, the retaining washer 64 is pushed inwardly until it abuts the adjacent end of the outer tubular member 60 and is there held in place, as by an E-ring clip 65. This drives the spacer 50 inwardly, compresses the compression spring 49, and causes the end portions 46 and 47 of the friction member 40 and the end portion 54 of the spacer 50 to tilt radially to deflected positions illustrated in FIGS. 3 and 4, non-coaxial with the shaft 31, this tilting movement being accommodated by the notches 43 and 52 and the flexible hinge portions 44 and 53. When the end portions 46, 47 and 54 have thus been tilted to their deflected positions, they are brought into frictional engagement with the inner surface 61 of the outer tubular member 60, thereby frictionally to inhibit rotational movement of the outer tubular member 60 and the visor panel 25 attached thereto, with respect to the shaft 31. It will be appreciated that the tilting movement of the end portions 46, 47 and 54 also tends to flex the friction member 40 and the spacer 50 radially outwardly adjacent to the inner ends of the hinge portions 44 and 53, thereby bringing these areas into frictional engagement with the inner surface 61 of the tubular member 60. In use, the attachment flap 26 of the visor panel 25 is wrapped around the outer tubular member 60.

It is a significant aspect of the present invention that the friction mount assembly 30 is self-adjusting. Thus, it will be appreciated that the compression of the spring 49 serves resiliently to urge the end portions 46, 47 and 54 into frictional engagement with the outer tubular member 60. As these end portions 46, 47 and 54 wear down, the action of the spring keeps tilting them further back to keep them in frictional engagement with the outer tubular member 60, until the end portions 46 and 47 are tilted back into engagement with the central portion 45 of the inner frictional member 40, and until the end portion 54 of the spacer 50 is tilted into engagement with the remainder thereof, thereby effectively closing the notches 43 and 52. As the end portions 46, 47 and 54 tilt up, the area of engagement thereof with the outer tubular member 60 increases, thereby maintaining the overall frictional force substantially constant even though the force exerted by the spring 49 gradually reduces as it expands.

The friction member 40 and the spacers 36 and 50 may be formed from a single extrusion of plastic material such as PVC or other suitable material, which is then cut to separate the pieces from one another and to form the notches 43 and 52. Similarly, the outer tubular member 60 may be formed of a plastic extrusion with the flat surfaces 63 being subsequently cut therein. Alternatively, the outer tubular member 60 may be formed of metal such as tempered aluminum, the wall thickness of which can be much less than that of a plastic tube, thereby reducing the outer diameter of the overall assembly 30.

Referring now to FIG. 12 of the drawings, there is illustrated an alternative embodiment of inner tubular friction member, generally designated by the numeral 70, which is provided with inclined end surfaces 71 and is characterized by two sets of radially-extending notches, including an inner pair of notches 72 and an outer pair of notches 73, each being substantially identical to the notches 43 in the friction member 40. The notches 72 and 73 serve to divide the friction member 70 into end portions 74, a central portion 75 and intermediate portions 76. More specifically, the intermediate portions 76 are connected to the central portion 75 by hinge portions 77 and to the end portions 74 by hinge portions 78. The inner diameter of the friction member 70 is enlarged at the ends thereof, as at 79, in the regions of the end portions 74 and the intermediate portions 76 to enhance the flexibility of the hinge portions 77 and 78.

In use, the friction member 70 can replace the friction member 40 and operates in essentially the same manner. However, as the end portions 74 wear down, they are tilted into engagement with the intermediate portions 76 which are then in turn tilted into frictional engagement with the inner surface of the outer tubular member 60. Thus, the life of the friction mount assembly 30 is greatly extended. It will be appreciated that any desired number of notches and corresponding tiltable portions may be formed in the inner friction member 70, limited only by the length of the friction mount assembly 30.

Referring now also to FIGS. 7 through 11 of the drawings, there is illustrated still another embodiment of the friction mount assembly of the present invention, generally designated by the numeral 130. The friction mount assembly 130 differs from the friction mount assembly 30 only in the construction of the inner tubular friction member and the outer tubular member. The other parts of the assembly are the same as in the friction mount assembly 30 and bear the same reference numerals.

The friction mount assembly 130 includes an inner tubular friction member 140 which has inclined end surfaces 141 and is provided adjacent to the opposite ends thereof with radially inwardly extending notches 142. The notches 142 are generally V-shaped, each having an outer side wall 143 which is disposed substantially normal to the longitudinal axis of the tubular member 140, and an inner side wall 144 which is inclined with respect to the longitudinal axis. More specifically, each of the side walls 144 is substantially parallel to the end surface 141 at the opposite end of the friction member 140. The notches 142 serve to divide the friction member 140 into a central portion 145 and two end portions 146 and 147. Each of the notches 142 extends more than halfway across the diameter of the friction member 140, the uncut portions immediately below the notches 142 forming flexible hinge portions to accommodate tilting movement of the end portions 146 and 147. Formed in the continuous portion of the inner surface of the friction member 140 opposite the notches 142 and extending the length thereof is an elongated keyway groove 148 for accommodating the key 34 of the shaft 31.

The outer surface of the friction member 140 is fluted, having formed therein a plurality of circumferentially spaced-apart elongated parallel ribs 149 extending the length thereof, the spaces between the ribs 149 defining elongated channels 149a, each substantially part-circular in transverse cross section.

The friction mount assembly 130 also includes an outer tubular member 160 which has a cylindrical inner surface 161 and an outer surface 162. Formed in the outer surface 162 and extending the length thereof are two substantially parallel elongated grooves 163, preferably spaced apart between 90° and 180°. Also formed in the tubular member 160 are two longitudinally spaced-apart, radially-extending notches 164, each having a depth such as to communicate with the grooves 163, and being positioned so as to overlie the central portion 145 of the inner friction member 140 in the assembled condition of the friction mount assembly 130.

There are also provided two spring clips, each generally designated by the numeral 165, and respectively associated with the notches 164. More specifically, each of the spring clips 165 may be formed of spring wire and includes parallel spaced-apart arms 166 respectively disposable in the grooves 163, and interconnected by an arcuate bridge portion 167 disposable in the associated one of the notches 164. The bridge portion 167 has an arcuate inwardly-extending friction projection 168 which is dimensioned for engagement in one of the channels 149a in the outer surface of the inner friction member 140 (see FIG. 11).

In operation, the end portions 146 and 147 of the inner friction member 140 are tilted up into frictional engagement with the outer tubular member 160 for frictionally inhibiting rotation of the tubular member 160 in the same manner as was described above with respect to the friction mount assembly 30. Additionally, the friction projections 168 of the spring clips 165 resiliently engage the fluted outer surface of the inner friction member 140 to provide a ratcheting action. Thus, as the outer tubular member 160 is rotated, the friction projections 168 of the spring clips 165 resiliently ratchet over the ribs 149 to provide a stepped motion, the engagement of the friction projections 168 in the channels 149a serving to provide additional inhibition to rotational movement of the outer tubular member 160.

In a constructional model of the present invention, the frictional members 40, 70 and 140 and the spacers 36 and 50 may be formed of PVC, other plastics or rubberized material, and the outer tubular members 60 and 160 may be formed of plastic or metal. The materials are selected to give the optimum balance between hardness or wear-resistance and coefficient of friction. The visor panel 25 may be formed of a sawdust-impregnated polyethylene or polypropylene, such as that sold by VAN DRESSER.

It will be understood that the inner frictional member 140 could be provided with plural sets of notches, as in FIG. 12. Also, it will be understood that the inner frictional members 40 and 140 could be provided with the inner diameters thereof enlarged in the regions of the end portions to enhance the flexibility thereof, as in FIG. 12.

From the foregoing, it can be seen that there has been provided an improved rotational friction mount and a sun visor assembly incorporating the same, wherein the friction mount is of economical construction and self-adjusting.

What is claimed is:

1. A rotatable friction mount for a visor or the like comprising a fixed inner elongated member having a flexible portion resiliently movable with respect to the remainder of said inner elongated member, an outer tubular member telescopically surrounding said inner member and rotatable with respect thereto about the longitudinal axis of said outer member, and discrete bias means coupled to said inner member and resiliently urging said flexible portion axially and radially of said outer member into frictional engagement therewith thereby to inhibit rotational movement thereof.

2. The friction mount of claim 1, wherein said inner member is tubular in shape.

3. The friction mount of claim 1, wherein said inner member has two flexible portions respectively disposed adjacent to the opposite ends thereof.

4. The friction mount of claim 1, wherein said inner member has four flexible portions, two of said flexible portions being disposed adjacent to each end of said inner member.

5. The friction mount of claim 1, wherein said mount includes two inner members, each having a flexible portion.

6. The friction mount of claim 5, wherein one of said inner members has two flexible portions thereon respectively disposed adjacent to the opposite ends thereof.

7. The friction mount of claim 1, wherein said inner member is tubular in shape and has two flexible portions respectively disposed adjacent to the opposite ends thereof, said inner member having an enlarged inner diameter in the region of said flexible portions.

8. A rotatable friction mount for a visor or the like comprising an elongated shaft an elongated tubular inner member non-rotatably mounted on said shaft coaxially therewith, said inner member having a radially extending notch therein adjacent to one end thereof defining a narrow flexible hinge portion connecting an end portion of said inner member to the remainder thereof, said hinge portion accommodating tilting movement of said end portion to a deflected position non-coaxial with said shaft, an outer elongated tubular member telescopically surrounding said inner member and rotatable with respect thereto about the longitudinal axis of said shaft, retaining means preventing movement of said inner and outer tubular members longitudinally of said shaft, and bias means coupled to said inner member and resiliently urging said end portion to its deflected position for frictional engagement with the inner surface of said outer member thereby frictionally to inhibit rotational movement of said outer member.

9. The friction mount of claim 8, wherein said notch has substantially parallel radially-extending side walls.

10. The friction mount of claim 8, wherein said notch has intersecting side walls.

11. The friction mount of claim 10, wherein said inner member has end surfaces inclined with respect to the longitudinal axis thereof, one of said end surfaces being substantially parallel to one of said side walls of said notch.

12. The friction mount of claim 8, wherein said retaining means includes stop members carried by said shaft respectively engaging the opposite ends of said outer member, and tubular spacer members surrounding said shaft within said outer member and cooperating with said inner member and said bias means for holding said end portion in its deflected position.

13. The friction mount of claim 12, wherein said bias means is a helical compression spring coaxially surrounding said shaft within said outer member.

14. The friction mount of claim 13, wherein one of said spacer members has a radially extending notch therein defining a narrow flexible hinge portion connecting an end portion of said spacer member to the remainder thereof, said hinge portion accommodating tilting movement of said end portion of said spacer to a deflected position non-coaxial with said shaft under the urging of said bias means for frictional engagement with the inner surface of said outer member.

15. The friction mount of claim 8, wherein said inner tubular member is keyed to said shaft.

16. A rotatable friction mount for a visor or the like comprising a fixed inner elongated tubular member having a plurality of circumferentially spaced-apart ribs extending longitudinally thereof on the outer surface thereof, an outer tubular member telescopically surrounding said inner tubular member and rotatable with respect thereto about the longitudinal axis thereof, said outer tubular member having a radially extending aperture therein, and friction means carried by said outer tubular member and projecting inwardly through said aperture for resilient ratcheting engagement with said ribs on said inner member thereby frictionally to inhibit rotational movement of said outer tubular member.

17. The friction mount of claim 16, wherein said outer tubular member has two radially extending apertures therein, and two friction means respectively projecting inwardly through said apertures.

18. The friction mount of claim 16, wherein said friction means comprises a resilient spring clip.

19. The friction mount of claim 18, wherein said outer tubular member has two longitudinally-extending substantially parallel grooves on the outer surface thereof, said friction clip including two legs respectively receivable in said grooves and a bridge portion interconnecting said legs and disposed in said aperture for ratcheting engagement with said ribs.

20. The friction mount of claim 16, wherein said ribs alternate with longitudinally-extending channels each having a transverse cross-sectional shape conforming to the engaging portion of said friction means.

21. A rotatable friction mount for a visor or the like comprising an elongated shaft, an elongated tubular inner member non-rotatably mounted on said shaft coaxially therewith, said inner member having a plurality of circumferentially spaced-apart ribs extending longitudinally thereof on the outer surface thereof, said inner member having a radially extending notch therein adjacent to one end thereof defining a narrow flexible hinge portion connecting an end portion of said inner member to the remainder thereof, said hinge portion accommodating tilting movement of said end portion to a deflected position non-coaxial with said shaft, an outer elongated tubular member telescopically surrounding said inner member and rotatable with respect thereto about the longitudinal axis of said shaft, retaining means preventing movement of said inner and outer tubular members longitudinally of said shaft, said outer tubular member having a radially extending aperture therein, friction means carried by said outer tubular member and projecting inwardly through said aperture for resilient ratcheting engagement with said ribs on said inner member, and bias means coupled to said inner member and resiliently urging said end portion to its deflected position for frictional engagement with the inner surface of said outer member, thereby frictionally to inhibit rotational movement of said outer member.

22. The friction mount of claim 21, wherein said inner member has end surfaces inclined with respect to the longitudinal axis of said shaft.

23. The friction mount of claim 22, wherein said notch has intersecting side walls, one of which is substantially parallel to one of said end surfaces.

24. The friction mount of claim 21, wherein said inner member has two of said notches therein respectively disposed adjacent to the opposite ends thereof.

25. The friction mount of claim 21, wherein said inner member has an enlarged inner diameter in the region of said end portion.

26. The friction mount of claim 21, wherein said inner member is keyed to said shaft.

27. The friction mount of claim 21, wherein said bias means is a helical compression spring coaxially surrounding said shaft.

28. The friction mount of claim 21, wherein said retaining means includes stop members carried by said shaft and respectively engageable with the opposite ends of said outer tubular member, and tubular spacer members surrounding said shaft within said outer tubular member and cooperating with said bias means to hold said end portion of said inner member in the deflected position thereof.

29. The friction mount of claim 28, wherein one of said spacer members has a radially extending notch therein defining a narrow flexible hinge portion connecting an end portion of said spacer member to the remainder thereof and accommodating tilting movement of said end portion of said spacer member to a deflected position in frictional engagement with the inner surface of said outer member.

30. A sun visor assembly comprising an elongated shaft, an elongated tubular inner member non-rotatably mounted on said shaft coaxially therewith, said inner member having a radially extending notch therein adjacent to one end thereof defining a narrow flexible hinge portion connecting an end portion of said inner member to the remainder thereof, said hinge portion accommodating tilting movement of said end portion to a deflected position non-coaxial with said shaft, an outer elongated tubular member telescopically surrounding said inner member and rotatable with respect thereto about the longitudinal axis of said shaft, retaining means preventing movement of said inner and outer members longitudinally of said shaft, bias means coupled to said inner member and resiliently urging said end portion to its deflected position for frictional engagement with the inner surface of said outer member thereby frictionally to inhibit rotational movement of said outer member, and a visor panel fixedly secured to said outer tubular member for rotational movement therewith.

31. The sun visor assembly of claim 30, wherein said outer tubular member has flattened portions at the opposite ends thereof, said visor panel having projections respectively engaging said flattened portions of said outer tubular member for cooperation therewith effectively to prevent longitudinal movement of said outer tubular member and said visor panel with respect to each other.

32. The sun visor assembly of claim 30, wherein said visor panel has a rectangular recess formed in one side thereof, and a mirror mounted in said recess.

33. The sun visor assembly of claim 32, and further including a cover hingedly mounted on said inner surface of said visor panel along the bottom edge of said mirror and movable between an open position uncovering said mirror and a closed postion covering said mirror, and fastening means for holding said cover in its closed position.

34. The sun visor assembly of claim 30, wherein said visor panel includes a mounting tab along one edge thereof adapted to be wrapped around said outer tubular member for securing said visor panel thereto.

* * * * *